United States Patent Office 3,660,497
Patented May 2, 1972

3,660,497
DODECYLETHER METHYL SULFIDES
Hill M. Priestley, North Bergen, and James H. Wilson, Demarest, N.J., assignors to Lever Brothers Company, New York, N.Y.
No Drawing. Continuation-in-part of application Ser. No. 869,985, Aug. 25, 1969, which is a continuation-in-part of application Ser. No. 647,333, June 20, 1967, which is a continuation-in-part of application Ser. No. 365,487, May 6, 1964, which in turn is a continuation-in-part of applications Ser. No. 725,505, Apr. 1, 1958, and Ser. No. 60,546, Oct. 5, 1960. This application Mar. 13, 1970, Ser. No. 19,484
Int. Cl. C07c *149/10*
U.S. Cl. 260—609 A     3 Claims

ABSTRACT OF THE DISCLOSURE

There are disclosed in the specification novel sulfides which are dodecyl acetonyl sulfide, dodecyloxyethyl methyl sulfide, and dodecyloxyethoxyethyl methyl sulfide, useful in the preparation of suds-stabilizing sulfoxides.

---

This application is a continuation-in-part of co-pending streamlined continuation Ser. No. 869,985, which is a continuation-in-part of application Ser. No. 647,333 filed June 20, 1967 and now abandoned, which in turn was a continuation-in-part of application Ser. No. 365,487, filed May 6, 1964, also now abandoned, which in turn was a continuation-in-part of our applications Ser. Nos. 725,505, filed Apr. 1, 1958, and 60,546, filed Oct. 5, 1960, now abandoned.

The present invention relates to novel sulfides having the general formula $$C_{12}H_{25}(OCH_2CH_2)_x\text{—S—R}$$

wherein X is O when R is the monovalent acetonyl radical, and X is an integer from 1 to 2 when R is the methyl radical. The sulfides are useful as intermediates for the preparation of sulfoxides, which in turn are useful as detergent foam stabilizers and as detergents.

Alkyl sulfoxides having a long chain fatty acid residue are known to have surface active properties. U.S. Pat. No. 2,787,595 to Webb discloses the use of alkyl sulfoxides as the essential active ingredient in detergent compositions. According to Webb, the sulfoxides may be employed per se as the essential active ingredient in detergent compositions, but preferably are employed in combination with inorganic "builder" salts. It is also stated in the patent that other synthetic detergents may be employed as detergency supplements in combination with the sulfoxides and that foam stabilizers may be added.

It is common practice in the industry to include foam stabilizers in detergent compositions to improve the persistence and stability of the foam produced by agitation of the washing solution containing the detergent composition. These foam stabilizers are particularly useful in detergent compositions based upon organic non-soap synthetic detergent compounds.

In accordance with the present invention, compounds prepared from the novel sulfides are provided from the group consisting of dodecycloxyethyl methyl sulfoxide, dodecyl acetonyl sulfoxide, and dodecycloxyethoxyethyl methyl sulfoxide.

The specific compounds of this invention are:

Dodecyl acetonyl sulfide:

$$C_{12}H_{25}SCH_2COCH_3$$

Dodecycloxyethyl methyl sulfide:

$$C_{12}H_{25}OCH_2CH_2SCH_3$$

Dodecyloxethoxyethyl methyl sulfide:

$$C_{12}H_{25}OCH_2CH_2OCH_2CH_2SCH_3$$

A preferred class within the above described sulfoxides include dodecyloxyethyl methyl sulfoxide, $$C_{12}H_{25}OCH_2CH_2SOCH_3$$

and dodecyloxyethoxyethyl methyl sulfoxide, $$C_{12}H_{25}OCH_2CH_2OCH_2CH_2SOCH_3$$

These materials are exceptionally suitable in the presence of household bleach.

It has been found that the presence of small amounts of the sulfoxides described above improve the stability of the foam produced by agitating aqueous solutions of suds-producing materials selected from the group consisting of anionic, ampholytic and nonionic organic synthetic detergents. The sulfides of the present invention are useful in preparing novel sulfoxides which are in turn useful as detergents and suds boosters.

The following table lists the novel sulfides of this invention together with their corresponding sulfoxides and related compounds, their melting points, and the melting points of the corresponding sulfones.

TABLE I

| Compound Number | Name | Formula | Melting point, °C. | Melting point of sulfone °C. |
|---|---|---|---|---|
| 1 | Dodecyloxyethyl methyl sulfoxide | $C_{12}H_{25}OCH_2CH_2SOCH_3$ | 43 | 66 |
| 2 | Dodecyl acetonyl sulfoxide | $C_{12}H_{25}SOCH_2COCH_3$ | 84 | 81 |
| 3 | Dodecyloxyethoxyethyl methyl sulfoxide | $C_{12}H_{25}OCH_2CH_2OCH_2CH_2SOCH_3$ | 43 | 44 |

| | | | Boiling point, °C. | |
|---|---|---|---|---|
| 4 | Dodecyl acetonyl sulfide | $C_{12}H_{25}SCH_2COCH_3$ | 150–160/1.0 mm. | |
| 5 | Dodecyloxyethyl methyl sulfide | $C_{12}H_{25}OCH_2CH_2SCH_3$ | 140/1.0 mm. | |
| 6 | Dodecyloxyethoxyethyl methyl sulfide | $C_{12}H_{25}OCH_2CH_2OCH_2CH_2SCH_3$ | 155/1.5 mm. | |

The 3 sulfoxides listed in Table I were prepared by the oxidation of the corresponding sulfides with concentrated nitric acid or with hydrogen peroxide in accordance with the following:

(a) 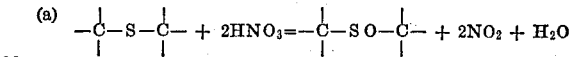

(b) 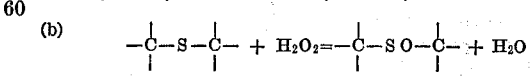

The sulfides, in turn, had been obtained by warming an alcoholic solution of the sodium mercaptide with a halide:

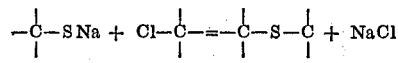

Thus, sodium dodecyl mercaptide when treated with chloroacetone gave dodecyl acetonyl sulfide:

$$C_{12}H_{25}SNa + ClCH_2COCH_3 = C_{12}H_{25}SCH_2COCH_3 + NaCl$$

Dodecyl acetonyl sulfide, $C_{12}H_{25}SCH_2COCH_3$, is novel. Similarly, sodium methyl mercaptide, when treated with dodecyloxyethyl chloride yielded dodecyloxyethyl methyl sulfide; and dodecyloxyethoxyethyl chloride gave dodecyloxyethoxyethyl methyl sulfide:

$$CH_3SNa + ClCH_2CH_2OC_{12}H_{25}$$
$$= C_{12}H_{25}OCH_2CH_2SCH_3 - NaCl$$

$$CH_3SNa + ClCH_2CH_2OCH_2CH_2OC_{12}H_{25}$$
$$= C_{12}H_{25}OCH_2CH_2OCH_2CH_2SCH_3 + NaCl$$

Both sulfides are novel.

Thus the listed sulfoxides can be prepared by first forming the sulfide from the sodium mercaptide and halide, and oxidizing this to the sulfoxide or obtained by the reaction of a halosulfoxide with a sodium mercaptide or alcoholate. In the latter case, no oxidation was necessary. The new intermediates (nonsulfoxides) are:

(1) dodecyl acetonyl sulfide:

$$C_{12}H_{25}SCH_2COCH_3$$

(2) dodecyloxyethyl methyl sulfide:

$$C_{12}H_{25}OCH_2CH_2SCH_3$$

(3) dodecyloxyethoxyethyl methyl sulfide:

$$C_{12}H_{25}OCH_2CH_2OCH_2CH_2SCH_3$$

EXAMPLE 1

Dodecyl acetonyl sulfide, $C_{12}H_{25}SCH_2COCH_3$. To a mixture of 101 g. dodecyl mercaptan and 300 ml. 3A alcohol, there was added, with stirring, a solution of 22 g. sodium hydroxide in 30 ml. of distilled water. The sodium mercaptide solution was then treated with 51 g. chloroacetone, a few grams at a time, with cooling and stirring. The mixture was allowed to stand at room temperature for half an hour, and then poured into two liters of water. The oil was extracted with 400 ml. ether, the ether solution washed with water, and dried over anhydrous sodium sulfate. The solvent was distilled off, and the residue fractionated. The yield of dodecyl acetonyl sulfide was 86 g. (67% of the theory), B.P. 155–160° C./1.0 mm. (bath temp. 195° C.). The phenylhydrazone derivative melted at 43° C.; the oxime was an oil; and the semicarbazone melted at 81° C.

Dodecyl acetonyl sulfoxide, $C_{12}H_{25}SOCH_2COCH_3$. A solution of 5.0 grams dodecyl acetonyl sulfide in 30 ml. acetone was treated with 1.75 ml. of 30% hydrogen peroxide. The solution was refluxed for 15 minutes on a water bath kept at 60° C. The reaction mixture was freed of the solvent by vacuum evaporation with a water pump on a water bath at 40° C. The solid residue was triturated with 50 ml. Skellysolve B in a mortar and filtered by suction. The material on the filter was washed with 10 ml. light petroleum ether. The yield of the sulfoxide was 4.1 grams, 75% of theory, and it had a melting point of 84° C. One gram, after recrystallization from 40 ml. Skellysolve B, yielded 0.85 gram of a product having a melting point of 84° C.; phenylhydrazone, melting point 73° C.

The ketosulfoxide is soluble in aqueous sodium hydroxide solution, in which it foams exceedingly. On acidification, the ketosulfoxide is recovered unchanged. Dodecyl acetonyl sulfoxide is much more stable in strong alkali than is the corresponding ketosulfone. Thus, the ketosulfoxide is recovered unchanged by refluxing it in 10% sodium hydroxide for 4 hours. A solution of dodecyl acetonyl sulfoxide in 10% aqueous sodium hydroxide was kept unchanged in the 52° C. oven for two weeks.

EXAMPLE 2

Dodecyloxyethyl methyl sulfoxide was prepared as follows: First, the monododecyl ether of ethylene glycol was formed:

$$C_{12}H_{25}Br + NaOCH_2CH_2OH$$
$$= C_{12}H_{25}OCH_2CH_2OH + NaBr$$

The starting product represents a dodecyl alcohol + 1 mole ethylene oxide adduct. That is, by passing in one mole of ethylene oxide into one mole of dodecyl alcohol, the same product should theoretically be formed as from the reaction of dodecyl bromide and sodium glycol. Actually, a complex mixture is the result, with some unchanged lauryl alcohol, and considerable amounts of the lauryl alcohol—2 mole ethylene oxide adduct. Still, for the preparation of a bleach-stable suds booster, the $$C_{12}H_{25}OH + 1ETO$$

adduct would be satisfactory. The hydroxyl group was then replaced with a halogen; and this in turn replaced by a methylmercapto group; and the product was finally oxidized with nitric acid:

$$C_{12}H_{25}OCH_2CH_2OH + SOCl_2$$
$$= C_{12}H_{25}OCH_2CH_2Cl + SO_2 + HCl$$

$$C_{12}H_{25}OCH_2CH_2Cl + NaSCH_3$$
$$= C_{12}H_{25}OCH_2CH_2SCH_3 + NaCl$$

$$C_{12}H_{25}OCH_2CH_2SCH_3 + 2HNO_3$$
$$= C_{12}H_{25}OCH_2CH_2SOCH_3 + 2NO_2 + H_2O$$

For the preparation of the monododecyl ether of ethylene glycol, 10.5 g. of metallic sodium was dissolved, a little at a time, in 250 g. of hot ethylene glycol. There was then added 100 g. of dodecyl bromide. The mixture was refluxed four hours, cooled, and treated with water. The oil was extracted with 500 ml. ether, and the ethereal solution washed with water several times, and then dried with sodium sulfate. After removal of the ether, the residue was fractionated. At an oil bath temperature of 225° C., the main fraction passed over at 170° C./15 mm. The yield was 61 g., or 66% of the theory.

To 23 g. of the monododecyl ether of ethylene glycol and 8 ml. pyridine, there was gradually added, with cooling and stirring, 16 ml. thionyl chloride. The mixture was heated on an oil bath at 100–110° C. for two hours, with constant stirring. It was cooled, and excess thionyl chloride decomposed with water. The oil was extracted with 200 ml. ether, the ethereal solution washed with water, then with sodium bicarbonate solution, and again with water. The ether was distilled off, and the residue fractionated. The main fraction amounted to 17.4 g., B.P. 180° C./26 mm. (bath temperature 220° C.). Later it had been found that fractionation was unnecessary. The residue after the ether evaporation was satisfactory.

The dodecyloxyethyl chloride was converted into the sulfide thus: metallic sodium, 1.3 g., was dissolved in 60 ml. 3A alcohol, and to this was added 4 ml. of condensed methyl mercaptan and 12.4 g. of the chloride. The mixture was refluxed for 2 hours. Water was added, and the oil extracted with 200 ml. ether, the ether solution washed with water, and dried with sodium sulfate. Removal of the ether left a residue which was distilled, B.P. 140° C./1.00 mm. (bath temp. 200° C.). The yield of dodecyloxyethyl methyl sulfide was 12.1 g. This is a new compound.

The sulfide, 5.1 g., was added gradually to 12 ml. concentrated nitric acid. This was treated with ice and water, and the oil was extracted with 100 ml. chloroform. The chloroform solution was washed with water, sodium bicarbonate solution, again with water, and dried with anhydrous sodium sulfate. The solvent was evaporated in vacuum; towards the end, 25 ml. of n-hexane were added, and the evaporation continued. The yield of dodecyloxyethyl methyl sulfoxide was 5.0 g., M.P. 43° C.

Dodecyloxyethoxyethyl methyl sulfoxide was prepared by a procedure similar to that described for the dodecyloxyethyl methyl sulfoxide, according to the following equations:

$$C_{12}H_{25}Br + NaOCH_2CH_2OCH_2CH_2OH$$
$$= C_{12}H_{25}OCH_2CH_2OCH_2CH_2OH + NaBr$$

$$C_{12}H_{25}OCH_2CH_2OCH_2CH_2OH + SOCl_2$$
$$= C_{12}H_{25}OCH_2CH_2OCH_2CH_2Cl + SO_2 + HCl$$

$$C_{12}H_{25}OCH_2CH_2OCH_2CH_2Cl + NaSCH_3$$
$$= C_{12}H_{25}OCH_2CH_2OCH_2CH_2SCH_3 + NaCl$$

$$C_{12}H_{25}OCH_2CH_2OCH_2CH_2SCH_3 + 2HNO_3$$
$$= CH_{12}H_{25}OCH_2CH_2OCH_2CH_2SOCH_3 + 2NO_2 + H_2O$$

The reaction product of monosodium diethylene glycol with dodecyl bromide represents the pure 100% adduct of lauryl alcohol with two moles of ethylene oxide ($C_{12}H_{25}OH + 2ETO$). The following two intermediates are new compounds:

Dodecyloxyethoxyethyl chloride, $$C_{12}H_{25}OCH_2CH_2OCH_2CH_2Cl$$

B.P. 150° C./1.5 mm. (oil bath temp. 210° C.)
Dodecyloxyethoxyethyl methyl sulfide, $$C_{12}H_{25}OCH_2CH_2OCH_2CH_2SCH_3$$

B.P. 155° C./1.5 mm. (bath temp. 225° C.)

EXAMPLE 3

A powdered detergent composition containing the sulfoxides of this invention as a foam stabilizing additive was prepared to have the following composition.

| Ingredient: | Percent |
|---|---|
| Sodium tetrapropylene benzene sulfonate | 18.0 |
| Sulfoxide | 3.5 |
| Sodium toluene sulfonate | 2.5 |
| Tetrasodium pyrophosphate | 25.0 |
| Pentasodium tripolyphosphate | 15.0 |
| Sodium silicate | 6.0 |
| Sodium carboxymethylcellulose | .5 |
| Water | 7.0 |
| Sodium sulfate and miscellaneous ingredients | 22.5 |
| | 100.0 |

The following sulfoxides were separately evaluated in the above formula: dodecyloxyethyl methyl sulfoxide, dodecyloxyethoxyethyl methyl sulfoxide and dodecyl acetonyl sulfoxide. The volume of foam produced in aqueous solutions of these compositions is equal or superior to that obtained using prior art foam stabilizers. In addition, the foam remains stable for a longer period of time than foams heretofore obtained.

What is claimed is:
1. Novel sulfides having the formula

$$C_{12}H_{25}(OCH_2CH_2)_x-S-CH_3$$

wherein X is an integer from 1 to 2.
2. A sulfide according to claim 1 which is dodecyloxyethoxyethyl methyl sulfide.
3. A sulfide according to claim 1 which is dodecyloxyethoxyethyl methyl sulfide.

References Cited

UNITED STATES PATENTS 3,335,189   8/1967   Degemner et al. ____ 260—609 A

JOSEPH REBOLD, Primary Examiner

D. R. PHILLIPS, Assistant Examiner

U.S. Cl. X.R.

252—161; 260—607 A